(12) United States Patent
Karabed et al.

(10) Patent No.: US 8,407,563 B2
(45) Date of Patent: Mar. 26, 2013

(54) LOW-COMPLEXITY SOFT-DECISION DECODING OF ERROR-CORRECTION CODES

(75) Inventors: Razmik Karabed, San Jose, CA (US); Hakan C. Ozdemir, Los Gatos, CA (US); Vincent Brendan Ashe, Campbell, CA (US); Richard Barndt, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 464 days.

(21) Appl. No.: 12/651,399

(22) Filed: Dec. 31, 2009

(65) Prior Publication Data

US 2010/0169746 A1 Jul. 1, 2010

Related U.S. Application Data

(60) Provisional application No. 61/142,024, filed on Dec. 31, 2008.

(51) Int. Cl.
*G11C 29/00* (2006.01)
(52) U.S. Cl. .......................... 714/769; 714/780
(58) Field of Classification Search .................. 714/769, 714/780
See application file for complete search history.

(56) References Cited

U.S. PATENT DOCUMENTS

| | | | | |
|---|---|---|---|---|
| 5,825,832 A * | 10/1998 | Benedetto | | 375/341 |
| 6,185,716 B1 * | 2/2001 | Riggle | | 714/769 |
| 6,343,210 B1 * | 1/2002 | Emmons et al. | | 455/226.3 |
| 6,381,726 B1 * | 4/2002 | Weng | | 714/780 |
| 6,662,338 B1 | 12/2003 | Rezzi et al. | | |
| 7,328,395 B1 * | 2/2008 | Burd | | 714/780 |
| 7,949,927 B2 * | 5/2011 | Park et al. | | 714/762 |
| 2004/0010748 A1 | 1/2004 | Ozdemir | | |
| 2004/0010749 A1 | 1/2004 | Ozdemir | | |
| 2004/0148561 A1 * | 7/2004 | Shen et al. | | 714/803 |
| 2007/0022357 A1 * | 1/2007 | Chiou | | 714/755 |
| 2009/0132894 A1 * | 5/2009 | Xu et al. | | 714/780 |

OTHER PUBLICATIONS

Chase (1972); IEEE Transactions on Information Theory; IT-18:170.

* cited by examiner

*Primary Examiner* — Yolanda L Wilson
(74) *Attorney, Agent, or Firm* — Graybeal Jackson LLP (57) ABSTRACT

A system and method for correcting errors in an ECC block using soft-decision data. In an embodiment, a soft-decision ECC decoding method, uses "soft" data indicative of how reliable bits of data are when read out. Such reliability information may be used to identify particular symbols with a higher likelihood of error such that these symbols may be changed in an attempt to reduce the total number of errors in the data. In an embodiment, a soft-decision ECC decoding path may include a reliability checker operable to receive bits of data read from a data store and operable to associate a reliability factor with each bit of data. Then, an update module may iteratively change bits or groups of bits based upon an ordering of the reliability factors.

29 Claims, 4 Drawing Sheets

FIG. 4

LOW-COMPLEXITY SOFT-DECISION DECODING OF ERROR-CORRECTION CODES

PRIORITY CLAIM TO PROVISIONAL PATENT APPLICATION

This patent application claims priority to U.S. Provisional Patent Application No. 61/142,024 entitled 'OPTIMIZED ERROR CODE CORRECTION' filed on Dec. 31, 2008 and is hereby incorporated by reference.

BACKGROUND

A data-communications system, such as a computer disk drive or a cell phone, includes a read channel, which recovers data from a received read signal (sometimes called a data signal) by interpreting a stream of bits. Such systems may read and write data to and from storage mediums and/or communication channels at ever-increasing rates. With the increase in data throughput, software and hardware may need to be more and more resilient to noise-induced errors. Thus, many communication and computer systems employ error-checking data processing that may be both hardware and software based in order to recover data if noise-induced errors arise.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

As discussed briefly above, hard-disk drive (HDD) systems and communications system use error-correction code (ECC) to assist with recovery of read data. For example, in a computer system having a HDD, when the computer system (i.e., a host system for the hard-disk system) writes data to or reads data from the disk, the data may be checked for errors that may arise due to noise and inter-symbol interference (ISI). In specific, during a read data process, errors in reading the data may occur from various problems that may be encountered in the read channel of a disk drive system. Such errors may cause one or more bits to be read out incorrectly; e.g., the read channel may interpret a bit as "0" when the bit should be "1" and vice versa.

ECC may be implemented as a function of statistical interpolation based on the data as it is read as well as other meta-data that is stored with the functional data from a storage medium. ECC is a mathematically-intensive process, but may greatly increase the reliability of data being read from a medium. As such, with the increased ability of hard-drive systems and other communications systems to transmit and receive data at greater speeds, improvements in ECC may complement the ability of such systems as well.

Hard-disk drive (HDD) systems and communication channels may use an ECC module to attempt to correct errors that may arise due to reading data incorrectly due to external noise within a particular system. BCH codes (as generally based upon the error correction coding algorithms developed by Bose and Ray-Chaudhiri—in which the acronym BCH derives from these inventor's names) allow algebraic syndrome decoding to be used to find and fix bit-reading errors. One particular BCH coding schema is Reed-Solomon (RS) coding. RS Coding is a form of the general BCH code wherein bits of data are grouped into symbols rather than being handled as individual bits. Generally speaking, sometimes the number of errors present in the symbols of the RS code are too numerous to fix using conventional methods.

Prior to discussing the figures and by way of initial overview, a summary of the subject disclosed herein is presented. Conventional methods for correcting errors in RS codes utilize a hard-decision decoding method wherein any errors are attempted to be corrected on a sector-by-sector basis. Thus, for a given sector of data (e.g., 512 bytes of data, for example), each RS code symbol should correspond to a coefficient in a polynomial that describes the entire sector. If errors arise, then at least one symbol will not correspond to any coefficient in this polynomial and therefore an error is identified. Conventional methods for dealing this error (as well as additional identified errors) involve using a Berlekamp-Messey algorithm to identify the location of the errors in the sector and a Chien-Formey search engine to correct the identified errors. As is discussed in greater detail below, this conventional method for dealing with errors may be referred to as hard-decision ECC decoding.

If the total number of errors are less than or equal to the corrections capability, the hard-decision ECC decoding will be able to correct all the errors. In an example, the number of errors that may be corrected is 40. If more than 40 errors are present, the then hard-decision ECC decoding method cannot solve for all errors and a soft-decision ECC decoding method may then be attempted. Soft-decision decoding increases the correction capability beyond the correction capability of a given ECC codeword, thus allows more data to be written to disk.

In a soft-decision ECC decoding method, additional "soft" data indicative of how reliable data is when read out may be used to identify particular symbols with a higher likelihood of error and then change these symbols first. In an embodiment, a soft-decision ECC decoding path may include a reliability checker operable to receive bits of data read from a data store and operable to associate a reliability factor with each bit of data. Then, an update module may iteratively change bits or groups of bits based upon an ordering of the reliability factors. As each attempt (i.e., flipping of unreliable bits) is made, the update module may determine just the total number or errors still remaining (as opposed to identifying the actual symbols with errors as is done via the Berlekamp-Messey algorithm).

Determining just the total number of errors instead of the actual locations is far less computationally intensive, and therefore, many combination of potential flip-bit combination may be analyzed quickly to determine if any combination might reduce the total number of errors enough to be handled by the conventional hard-decision ECC decoding method. That is, if the total number of errors is less than the correction capability of the Chien-Formey search engine, then the particular combination of flipping of unreliable bits may be realized and the overall sector may be corrected again using the hard-decision ECC decoding path again. Details regarding the hard-decision ECC decoding and the soft-decision ECC decoding are discussed in greater detail with respect to FIGS. 1-3.

Figure 1:
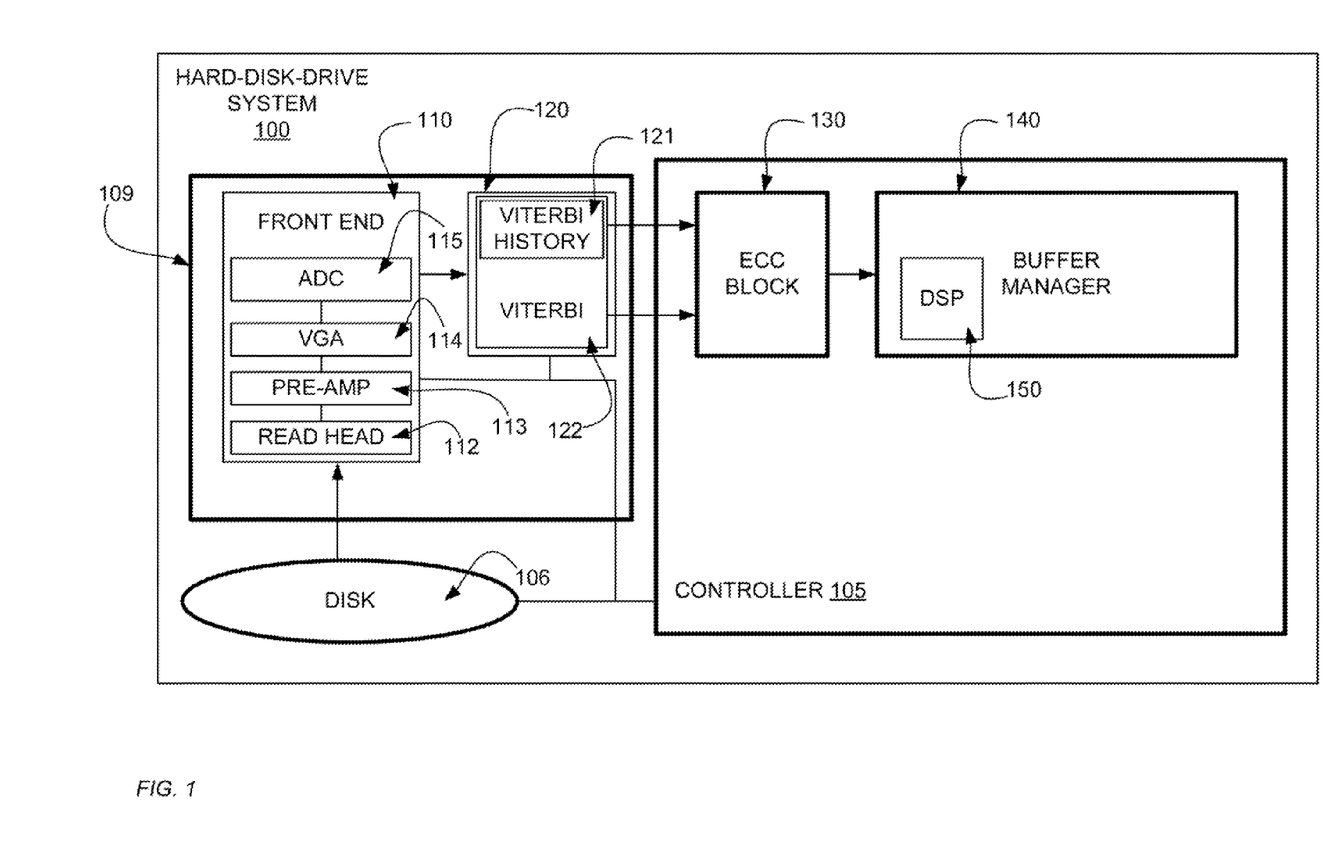
FIG. 1 is a block diagram of an embodiment of a hard-disk-drive system that may use soft data for error-checking.

FIG. 1 is a block diagram of a hard-disk-drive (HDD) system 100 according to an embodiment of the subject matter disclosed herein. Such an HDD system 100 may read data from a hard disk 106 or write data to the hard disk. For the purposes of soft-decision decoding of ECC, only the read operation of the HDD 100 is discussed herein.

Generally speaking, the HDD 100 may include a read channel 109 that may read data from a disk 106 and then pass read data through an ECC block 130 to a buffer manager 150 before eventually being passed along to a host computer (not shown). Each of these components may be controlled by a local HDD controller 105. Further, a skilled artisan will understand that these components (with the exception of the disk 106) may be disposed on a single integrated circuit die, individual integrated circuit dies or any combination of dies thereof. Each of these components is discussed further in the following paragraphs.

When data is to be read from a disk 106, a read head 112 that is part of a front end 110 interprets signals detected on the disk 106 to produce a stream of bits to be sent to a read data path. The front end 110 may include amplification and processing circuitry that assists with reading of data stored on the disk 106. Such circuitry may include pre-amplifier 113, a variable-gain amplifier (VGA) 114, and an analog-to-digital converter (ADC) 115. The read head 112 and pre-amplifier 113 convert the data stored on the disk 106 into an analog read signal, and the VGA 114 adjusts the amplitude of the analog read signal to a value or range of values deemed suitable for the subsequent components of the read circuit 120. The ADC 115 samples the gain-adjusted analog read signal and converts the analog read signal into a digital read signal that may then be passed to the read circuit 120. As was discussed earlier, noise and inter-symbol interference (ISI) may cause read errors wherein bits of data are affected when being read. Such noise-induced errors may be passed to the read circuit 120.

The read circuit 120 includes several data processing components such as filters and the like (not all are shown) for interpreting the read signal. Generally speaking, data read from the disk 106 may be stored and processed in groupings of eight or ten bits (or other suitable grouping numbers) depending on the RS code being employed. A grouping of bits may be referred to as an ECC symbol wherein a sector of data (comprising 512 bytes of data, for example) may include approximately 410 ECC symbols. These ECC symbols are used for error correction as discussed further below.

The read circuit 120 then interprets signals from the front end 110 on a bit-by-bit basis to reconstruct the symbols of the RS codeword. One component for accomplishing this interpretation is a Viterbi detector 122 that includes a path-history exchange block 121. The Viterbi detector 122 processes the sampled digital read signal to produce a signal comprising a stream of bits having definitive logical values representing "1" or "0". An example of a Viterbi detector that may be the same as or similar to the Viterbi detector 122 is disclosed in U.S. Pat. No. 6,662,338 and U.S. Publication Nos. 2004/0010749 and 2004/0010748, which are incorporated by reference. To help the reader understand the present application better, a brief overview of the operation of the Viterbi detector 122 is presented in the following paragraphs.

A Viterbi detector 122 "recovers" data stored on the disk 106 from the digitalized samples of the read signal generated by the read head 112. Assuming the stored data is binary data, the read head 112 senses one or more bits at a time as the surface of the disk 106 spins, and generates a series of sense voltages that respectively correspond to the sensed bits. This series of sense voltages composes the read signal, which consequently represents these sensed data bits in the order in which the read head 112 sensed them.

Unfortunately, because the disk 106 spins relatively fast with respect to the read head, the read signal is not a clean logic signal having two distinct levels that respectively represent logic 1 and logic 0. Instead, the read signal is laden with noise and ISI, and thus more closely resembles a continuous analog signal than a digital signal. Using a sample clock (not shown), the front end 110 samples the read signal at points that correspond to the read head 112 being aligned with respective bit storage locations on the surface of the disk. The ADC 115 digitizes these samples, and generally, a signal-conditioning block (e.g., the VGA 114 and ADC 118) adjusts the gain and timing of these samples and further equalizes these samples, before passing them to the Viterbi detector 122. The Viterbi detector 122 generates a sequence of bit values that is the most likely interpretation of the sequence of bit values stored on the disk 106. The manner in which the most likely interpretation is determined is discussed further.

In determining the output data sequence of the Viterbi detector 122, a dynamic programming detection algorithm (i.e., a Viterbi algorithm) may be used to determine the most probable interpretation of the signals from the front end 110 by passing possible interpretations through various "paths" of a state machine. (Although called a state machine here, those skilled in the art understand that such a reference is made for ease of understanding as the iterations of various dynamic calculations may be software-based and not embodied in any traditional state machine.) As is discussed in greater detail in the aforementioned U.S. Pat. No. 6,662,338, each bit is deterministically calculated by analyzing previous and subsequent bits with respect to the bit being analyzed. Such a calculation determines a "cost" (in term of computational iterations) of determining a logic value of a read bit of data. Thus, the Viterbi algorithm continuously calculates the cost of determining a logical state, and the value of each bit is determined by choosing the least costly path to that bit. The least costly path is the most likely interpretation of the actual bit. It is this most likely determination that is sent to the output of the Viterbi detector 122.

Assuming a noiseless read signal and binary stored data, the read circuit 120 may actually generate digitized read-signal samples having no errors. With such a noiseless environment, the cost of the correct path (correct bit sequence) would be zero, thereby indicating that the likelihood of the correct interpretation is at a maximum. However, as noise and ISI is introduced, different bits may be read incorrectly. In a hard-decision ECC decoding method, only the least costly path (i.e., most likely interpretation) is used for determining the output for each bit. However, as is discussed below, a soft-decision ECC decoding method may use additional information about how the Viterbi algorithm decision was reached.

In a soft-decision ECC decoding method, the relative proximity of the "distance" difference between the most likely path and the second most likely path is an indication of the reliability of dynamic determination, e.g., a reliability factor indicative of how reliable the hard decision is. For example, in the noiseless environment the correct path has a cost of "0", indicating the strongest likelihood that the bit is interpreted correctly. However, as noise is becomes a factor, the correct (transmitted) sequence (path) accumulates error, thus making its cost nonzero. In some cases the noise can increase the cost of the correct path so much that a different (wrong) path with less cost can be selected by the Viterbi algorithm, leading to an error in the detection. The magnitude of the difference in cost of arriving at a decision for a bit is an indication of the reliability of the dynamic determination of the state machine. As this difference decreases, it becomes less likely that the interpretation of the bit is correct.

This difference may be stored in a register (not shown) in the path history exchange block 121 to calculate reliability which is used in the ECC block 130 as discussed below with respect to FIG. 2. The Viterbi detector 122 may then send the estimated data sequence (e.g., a data sequence based solely upon the hard decisions of the Viterbi algorithms) to an ECC block 130 for error checking. Once errors (if any) have been corrected, the data sequence may be sent to a buffer manager 140 for additional digital signal processing (DSP 150). Aspects of the ECC block and the hard-decision and soft-decision ECC methods are described below with respect to FIGS. 2 and 3.

Figure 2:
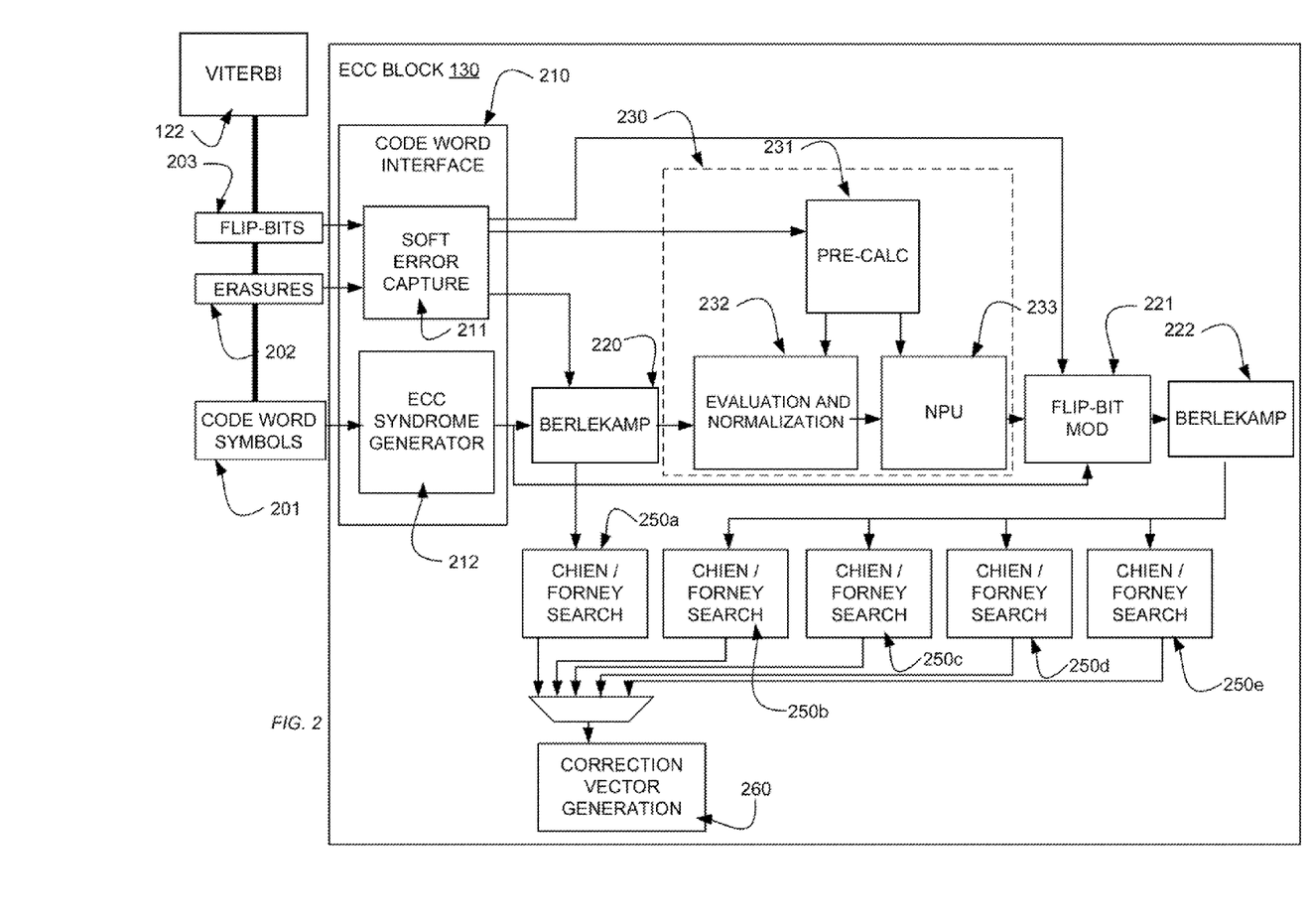
FIG. 2 is a block diagram of an embodiment of an error-code correction block (ECC) that may be part of the controller of FIG. 1.

FIG. 2 is a block diagram of an ECC block 130 according to an embodiment of the subject matter disclosed herein. As before with respect to FIG. 1, only aspects of a read channel and read operation are discussed with respect to FIG. 2. The ECC block 130 may be a functional computing block having program modules for accomplishing the computations and tasks described. Alternatively, aspects of the ECC block 130 may also be hardware-based logic such that computations and tasks are accomplished without use of a processor or by processing instructions. Further, the various components described herein may comprise any combination of hardware or software based modules disposed on one or more integrated circuits.

The ECC block 130 receives data from the read circuit (120 of FIG. 1) in three different manners at a code word interface 210. Depending on the nature of the received data, the code word interface 210 includes different modules for manipulating the data into a format for providing an error-code checking schema. The actual data sequence as interpreted by the hard decisions of the Viterbi detector 122 may be sent in the form of code word symbols 201. Soft data, i.e., the reliability information of the received data is used to identify most likely error events in the detected data sequence. Soft-decision data may be sent to the code word interface 210 in the form of flip-bit identifications 203 and erasure identification 202. The reliability information as used in a soft-decision ECC method is discussed further below after a discussion about the hard-decision ECC method involving just the hard decisions of the Viterbi detector 122.

The code word symbols 201 may be a RS-coded series of bits comprising ten-bit symbols of data within a disk sector as read from the disk. Errors may be checked and corrected on a sector-by-sector when reading data from the disk (106 of FIG. 1). In one embodiment, sectors comprise 512 or 1024 bytes of data. As such, each symbol in the code word symbols 201 may be coded into ten-bit symbols. Different embodiments may use different lengths for symbols, such as an eight-bit length in one other embodiment. Any bit-length for symbols may be used, but for the purposes of this example, a ten-bit symbol is used. Therefore, if one reads one data sector (which may be 512 bytes, for this example), the data sector may have about 410 ten-bit symbols representing the user data in the data sector.

Further, the read channel 109 (FIG. 1) may also have an ECC encoder (not shown) that adds ECC parity symbols to provide error correction capability. In an embodiment, RS encoding used in HDD systems may add a number of parity symbols that is twice the error-correction capability T (e.g., the number of errors the ECC block may handle when only using a hard-decision ECC decoding method) of the ECC block 130. For example, if the error-correction capability T is 20, corresponding to a correction capability of 20 symbols, there will be 40 ECC parity (also called ECC redundancy) symbols. These parity symbols are typically written immediately after the user data in the sector of data. Thus, for T=20, and 410 user data symbols, a total of 450 symbols will be read from the disk.

After the Viterbi detector sends its hard-decisions on the individual bits read from the disk to the ECC block 130, this 450-symbol grouping of bits may then be used to generate a syndrome at the ECC syndrome generator 212.

As syndromes representing a sector of data are computed, they are passed to a Berlekamp algorithm block 220. The Berlekamp algorithm block 220 generates an error locator polynomial $\delta(x)$ that is a polynomial which has roots at the error locations of the received data stream (which is a RS codeword). After the error locator polynomial $\delta(x)$ is generated, the first 250a of five Chien-Formey search engines may be used to find the roots and error magnitude by brute force in a hard-ECC decoding method. Depending on the actual number of errors identified, i.e., the degree of the error-locator polynomial $\delta(x)$, the first Chien-Formey search engine may or may not be able to correct the specific errors with the sector. If the number of the errors is less than the error-correction capability T of the ECC block 130, then the Chien-Formey search engine 250a will be able to find and correct all the errors. If the number of errors is greater than error-correction capability T, then this Chien-Formey search engine 250a will not be able to find the roots, and will indicate a decoding failure.

As such, if the degree of the initial error-locator polynomial $\delta(x)$ that was generated by the first Berlekamp algorithm block 220 is less than a threshold (e.g., 20 errors for example) for the Chien-Formey search engine 250a, any remaining soft-ECC decoding may not be necessary. However, as the number of erroneous symbols exceeds the error-correction capability T, the hard-decision ECC decoding method fails. Thus, in addition to the hard-decision ECC decoding in this path as just discussed, a soft-decision ECC decoding path may also be employed for attempting to correct symbol errors by methods beyond the hard-decision ECC decoding method.

In a soft-decision ECC method, additional reliability information from the Viterbi detector about the detected bits may also be used in the ECC decoding process. The soft-decision ECC method may be used in an ECC block 130 concurrent with or after a conventional hard-decision ECC method.

The soft-decision ECC method is based on a concept referred to as reliability. Reliability may be a mathematical determination based on a logarithmic likelihood ratio (LLR). This reliability information could be based on many different algorithms. In one embodiment, the logarithmic likelihood ratio for any given bit in a sequence of bits may be determined based upon the soft data used by the Viterbi detector 122 to arrive at its hard decision for each bit. As discussed above, each bit may determined by identifying the least costly path (i.e., most likely interpretation) and the second least costly path (i.e., second most likely interpretation). Thus, the likelihood ratio may be a ratio between the costs of competing paths. Then the logarithm of this difference may be used as a factor for determining how reliable the Viterbi decision was. With the LLR algorithm, a reliability equal to zero indicates that it is equally likely that a detected bit is zero or one, further indicating a high error probability for this bit (i.e. 0.5).

The reliability information from the Viterbi detector 122 may be used to identify and list the least reliable bit locations that correspond to the most likely error events and most likely locations for erasures. This list may be sent to the code word interface 210 as a stream of flip-bit data 203 from the path-history exchange block 121 (FIG. 1) of the Viterbi detector 122. Here, a soft-error capture block 211 passes this information to a soft-ECC block 230 that may be part of the overall ECC block 130. The soft-ECC block 230 may then use this list to iteratively attempt to correct errors using the initial (hard-decision) error-locator polynomial of the first Berlekamp algorithm block 220. The size of this list affects the computation complexity and processing time, as all combinations of the error events need to be tested.

Further, the soft-error capture block 211 may also receive data from the Viterbi detector 122 about erasures 202 in the sector. An erasure may be the location of an error event that could not be confidently identified via the Viterbi algorithm. As such, bits of this nature may be identified as an erasure and handled differently within the ECC-block 130. Such erasure data may be passed to the hard-decision ECC decoding path to the first Berlekamp algorithm block 220 as well as to the soft-decision ECC decoding path. Handling of such erasure data within the ECC block 130 and specifically within a Berlekamp algorithm block 220 is the subject of related U.S. patent application Ser. No. 12/651,386, entitled A NON-POLYNOMIAL PROCESSING UNIT FOR SOFT-DECISION ERROR CORRECTION CODING filed concurrent with this application and is hereby incorporated by reference. Other than using the degree of the erasures (i.e., the number of erasures identified), no further discussion of erasures is discussed herein.

Focusing back to the soft-ECC block 230, a pre-calculation block 231 may organize the error event list as received. This pre-calculation block 231 creates an ordering of the bits associated with each LLR from least reliable to most reliable. By reordering bits in this manner, the least reliable bits may be seeded higher in an iterative bit-flipping procedure when attempting to find a suitable combination of bits for error correcting. As may be the case, several bits may have the same LLR. Therefore, these bits with the same LLR may be grouped together as a flip word of an arbitrary length. The bits of this word are consecutive bits within the sector and are grouped only because each bit has the same LLR as determined by the soft-error capture block 211. For example, eight different bits may be associated with an LLR of 0.8 indicating a low level of reliability and, therefore, may be grouped together as a first flip word and ordered first. Similarly, another set of six bits may be associated with an LLR of 0.7 indicating the next lowest level of reliability. This second set of six bits may be grouped as a second flip word and ordered second.

As groupings of bits are associated by LLR rank and organized into flip words, the flip words may then be ordered according to the flip word's reliability. In one embodiment, the soft-ECC block 230 may handle up to eleven flip words of a length up to ten bits per flip word. These parameters may be smaller or larger and may be programmable within the ECC block 130. Further, the pre-calculation block 231 may set up the ordered list of flip words as a grey-code ordered list. Grey code ordering is known in the industry and provides an iterative ordering of the flip words such that only one change per iteration is allowed.

For example, in a four-bit word, counting from 0000 (i.e., binary zero) wherein each bit starts as a zero value, the first bit may be changed in a first iteration yielding 0001 (i.e., binary one). In normal binary ordering, the next sequence would a binary two (i.e., 0010) however, this would mean changing two bits. That is, the least significant bit changes from one to zero and the second least significant bit changes from zero to one. In grey-code ordering, however, the next sequence would be a binary three (i.e., 0011) such that the second least significant bit stays as a one and only the least significant bit changes from zero to one. Then in a next pass, the count may proceed to a binary two (i.e., 0010) such that only one bit is again changing; the least significant bit flips back to zero.

By using grey-code ordering for the selection of least reliable flip words, each bit of each word is flipped together on a word-by-word basis. Thus, only one word at a time is flipped similar to the one bit at a time example above. This concept is illustrated and discussed in greater detail below with respect to FIG. 3. For now, the remaining discussion of FIG. 2 continues.

The ECC block 230 includes two additional components. These components are an evaluation and normalization block 232 and a non-polynomial Berlekamp update unit (NPU) 233. As briefly discussed in the summary section above, the soft-ECC block 230 attempts combination after combination of flip-word bit flipping in an effort to find a combination that may be handled by an available Chien-Formey search engine 250a-250e. These components, together with the grey-code ordered list of flip words may iteratively find a particular bit-flip pattern in which enough errors in the sector are corrected such that any remaining errors may be handled by the other components of the overall ECC block 130. Ultimately then, the soft-ECC block 231 is comparing the remaining identified errors in any given sector, referred to as the degree D (of the error-locator polynomial δ(x) as generated by the first Berlekamp algorithm block 220) to the error-correction capacity T of the total number of errors in which the hard-ECC method may effectively handle. If D is less than T for a given comparison, then a particular bit-flip combination is a candidate for a hard-ECC correcting using an available Chien-Formey engine 250b-250e. Further, in an ECC block 130 that supports erasures, the degree D may be defined as the sum of the number of errors (as identified by the degree of each new error-locator polynomial) and the number of erasures (as identified by the Viterbi detector 122).

In an iterative manner then, the evaluation and normalization block 232 may flip one flip-word at a time. After flipping each bit in the flip-word, the NPU 233 may determine whether or not the degree D is less than the error-correction capacity T. This is accomplished by determining only the degree of a new error-locator polynomial as modified by the fact that the bits of one flip-word have been changed. The NPU 233 is described in greater detail in related U.S. patent application Ser. No. 12/651,386 entitled A NON-POLYNOMIAL PROCESSING UNIT FOR SOFT-DECISION ERROR CORRECTION CODING and filed concurrent with the present application and is incorporated herein by reference. The NPU 233 is far less computationally intensive than the above-described Berlekamp algorithm because the NPU 233 only determines the degree D of a new error-locator polynomial and not its actual coefficients. As a result, combination after combination of flip-word flips may be quickly evaluated prior to attempting computationally intensive portions of the hard-decision ECC decoding method. Thus, only candidate combinations that meet the criteria of D<T may be sent out of the soft-ECC block 230 for an attempt at hard-decision ECC decoding.

As candidates are identified (e.g., flip-word combinations that meet the criteria D<T), the particular pattern of flip bits may be sent to a flip-bit modification block 221. Together with the initial syndromes and erasure identifications, new syndromes may be created with the particular flip bits changed as identified by the soft-ECC block 230. Then the new syndromes may be sent to a second Berlekamp algorithm block 222. The second Berlekamp algorithm block 222 (much like the first one 220) generates an error locator polynomial $\delta(x)$ that is now correctible with less roots than the error-correction capability T. The identified symbols of the error locator polynomial $\delta(x)$ may then be used by one of the other four 250b-e Chien-Formey search engines in a hard-ECC decoding method.

Each Chien-Formey search engine 250a-250e may simultaneously attempt to solve the identified errors given a particular syndrome and error-locator polynomial $\delta(x)$. That is, as candidate combinations of flip words are identified and sent from the soft-ECC block 230, up to four candidates may be attempted at the same time in Chien-Formey search engines 250b-250e. (The first one 250a is reserved for the initial hard-ECC method using the first Berlekamp algorithm block 220.) Thus, if any one of the Chien-Formey search engine 250a-250e solves for all sector errors, then the solution is passed to a correction vector generation block 260 that generates a new corrected sequence of bits to pass along to the buffer manager 140 (FIG. 1). Once a solution is found, any remaining search currently still executing is halted and flushed. An example of using soft data for an ECC method may be better understood with reference to FIG. 3.

Figure 3:
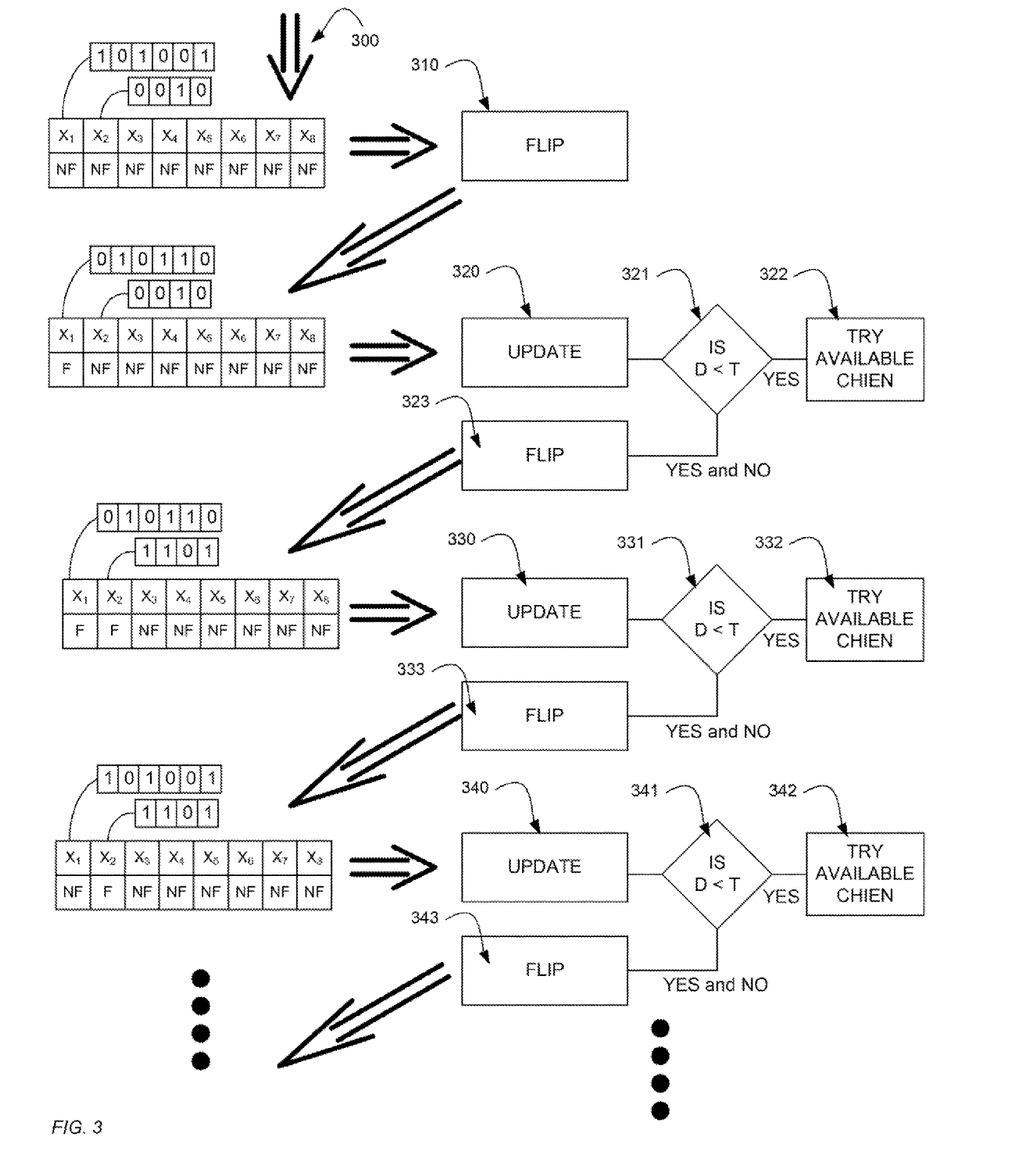
FIG. 3 is a hybrid block/flow diagram of an embodiment of a method for using soft data as part of the ECC block of FIG. 2.

FIG. 3 is a hybrid block/flow diagram of an embodiment of a method for using soft-decision ECC data as part of the ECC block of FIG. 2. In this diagram, the starting point 300 corresponds to when the soft-ECC block 230 (FIG. 2) has already identified and ordered (grey-code) the flip words $X_1$-$X_8$ wherein each flip word remains "not flipped" (NF) and in its original state as decoded by the Viterbi detector 122 (FIG. 2) as was discussed above, the flip-words $X_1$-$X_8$ are arranged is descending order starting with the least reliable word $X_1$ to the eighth-least reliable word $X_8$. In other embodiments, more or less than eight flip words may be used depending speed requirements and computing power available in the read channel. The flip-words $X_1$-$X_8$ are then iteratively flipped in a grey-code manner in an attempt to find a combination suitable for being solved by a Chien-Formey search (i.e., to find a combination wherein the degree D of the errors is less than the error-correction capacity T for correcting the errors).

To begin, the first flip-word $X_1$ is flipped. As can be seen, the first flip word may initially be a 6-bit word with a bit sequence of 101001. After bit-flipping at step 310, the new flip-word $X_1$ has a bit sequence of 010110 (i.e., each bit in the flip word has been flipped. This is indicated further in the diagram by the "F" denotation below the flip-word $X_1$. With the newly flipped bits in this flip-word $X_1$, the NPU block 233 (FIG. 2) may then determine the total number of errors (e.g., the degree D) with the newly flipped bits in the bit sequence at update step 320. At step 321, if it is determined that the degree D is less than the error-correction capacity T, then the combination is deemed a potential candidate and the combination is sent to an available Chien-Formey search engine at step 322.

If it is determined that degree D is not less than error-correction capacity T, then the method proceeds to step 323 for an additional flip-word to be flipped. Further, even if it was determined that degree D was less than error-correction capacity T, the method still continues until the overall method solves for all bit errors. Thus, while an available Chien-Formey search engine is performing a search for one candidate combination, the method still continues as other candidates may produce results faster than the first identified candidate. As such, the next iteration of bit-flipping is performed at step 323. As can be seen the next flip-word $X_2$ is flipped (but the first flip-word is not yet flipped back per the grey-code ordering).

With the new combination of flip-words $X_1$ and $X_2$ flipped, an update step 330 is again performed to determine degree D and then the method checks if degree D is less than error-correction capacity T at decision block 331. If so, then another (assuming the first was as well) candidate combination is identified as forwarded to an available Chien-Formey search engine at step 332. Again, whether or not degree D is less than error-correction capacity T, the method still continues to another flipping at step 333. Continuing with the grey-code ordering, flip-word $X_1$ is then flipped back to "NF" so that this particular combination may be attempted at update step 340 and decision block 341. As before, if degree D is less than error-correction capacity T, then yet another search is attempted at step 342 and the flip-word flippings continue with another update at step 343. This method may continue for every combination of word-flip combination (in this example, $2^8$ iterations because of eight possible flip-words) until all combinations are tried yielding no combinations wherein degree D is less than error-correction capacity T or if one of the candidate combinations succeeds in resolving all errors in the sector.

Thus, the iterative method of systematically attempting every combination of flip words may result on one or more combinations that reduce the total number of errors to below the error-correction capacity T.

Figure 4:
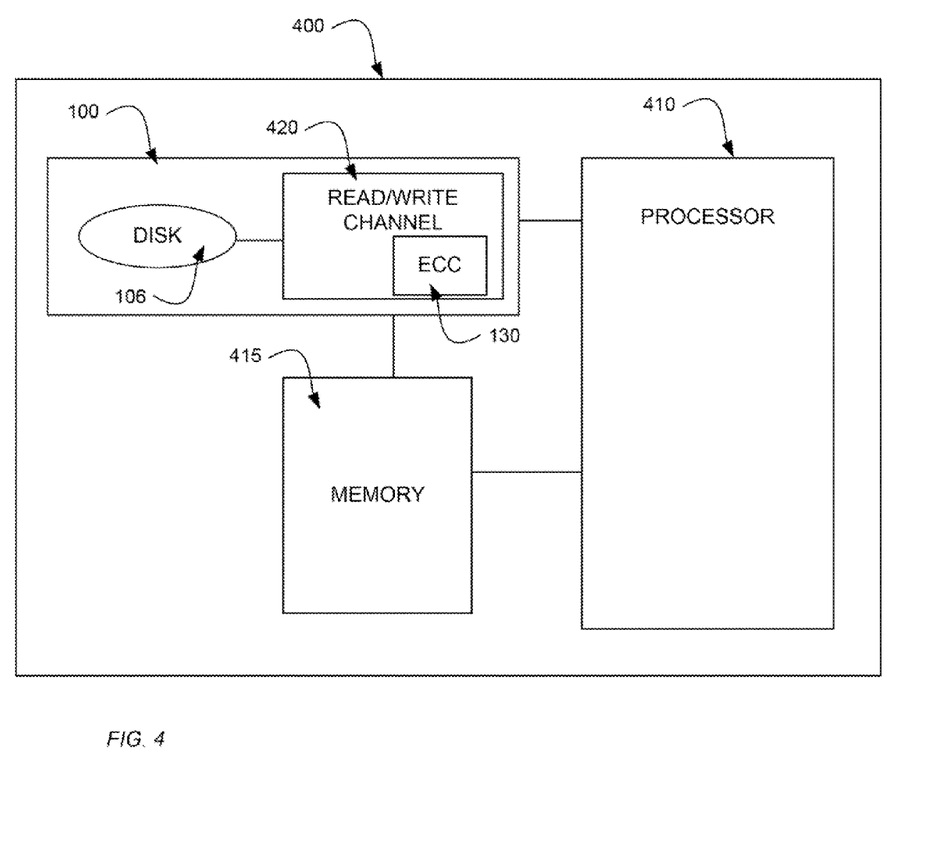
FIG. 4 is a block diagram of an embodiment of a computer system that may implement the HDD of FIG. 1 and the ECC block of FIG. 2.

FIG. 4 is a block diagram of an embodiment of a computer system 400 that may implement the HDD system 100 of FIG. 1 and the ECC block 130 of FIG. 2. In this system embodiment, the system 400 may include a processor 410 coupled to a local memory 415 and coupled to the HDD system 100. As can be seen, the HDD system 100 includes a hard disk 106 and a read/write channel 420 having an ECC bock 130. The processor 410 may be operable to control the memory 415 and the HDD system 100 in transferring data to and from the disk 106 and to and from the memory 415. Further, additional data stores and communication channels (not shown) may be used to transfer data to and from the HDD system 100 that may be remote from this computer system 400.

Such a computer system may be any number of devices including a CD player, a DVD player, a Blu-Ray player, a personal computer, a server computer, a smart phone, a wireless personal device, a personal audio player, media storage and delivery system or any other system that may read and write data to and from a storage medium or communication channel.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. An error-correcting module, comprising:
a reliability checker configured to receive bits of data read from a data storage and operable to associate a reliability factor with each bit of data;
a pre-calculator configured to associate bits having similar reliability factors into groups;
an updater configured to iteratively correct errors based upon the reliability factor of a group; and
a transmitter configured to transmit the corrected bits of data.

2. The module of claim 1 wherein the reliability factor comprises soft-decision data including a ratio corresponding to a likelihood that the bit has been read incorrectly.

3. The module of claim 2 wherein the ratio comprises a logarithmic ratio between a least costly path as determined by a Viterbi detector and a second least costly path as determined by the Viterbi detector.

4. The module of claim 2 wherein the likelihood that is bit has been read incorrectly is proportional to the magnitude of the difference between a first determination of a Viterbi detector and a second determination of the Viterbi detector.

5. The module of claim 1 wherein the reliability checker is further configured to determine that a bit that has been marked as an erasure.

6. The module of claim 1, further comprising an ordering module operable to order groups according to each bit's respective reliability factor such that the updater iteratively corrects errors beginning with the least reliable group.

7. The ordering module of claim 6 comprising a gray-code ordering schema.

8. An error correction code module, comprising: a hard-decision decoding path configured to correct code errors in a stream of bits using a hard-decision decoding method; a soft-decision decoding path configured to correct code errors in the stream of bits using a soft-decision decoding method; and a memory coupled to the soft-decision decoding path; wherein the soft-decision coding path includes an ordering module configured to organize identified bits of data having potential errors into flip-words and configured to order to the flip-words into an ordering corresponding to a likelihood of error, the soft decision coding path storing the ordered flip-words into the memory.

9. The module of claim 8, wherein the soft-decision decoding path further comprises:
a flip module configured to change each bit in a flip-word; and
a nonpolynomial update unit configured to determine if a threshold of errors are eliminated after flipping bits in the flip word.

10. The module of claim 9 wherein ordering module is configured to handle up to eleven flip-words wherein each flip-word comprises up to eight flip-bits.

11. The module of claim 9 wherein the threshold comprises a number of errors to be corrected such that the total number or errors is less than an error correction capability of the hard-decision decoding path.

12. The module of claim 9, wherein the soft-decision decoding path further comprises a modification block operable to modify bits in the stream of bits if the threshold is met.

13. The module of claim 8 wherein the soft-decision decoding path is invoked if and only of the hard-decision decoding path cannot correct all code errors on a first attempt.

14. The module of claim 8 wherein the hard-decision decoding path comprises:
a Berlekamp-Messey algorithm module configured to determine one or more code errors in a sector of data, the sector of data comprising a sequence of bits as determined by a Viterbi detector; and
a Chien-Formey search engine coupled to the Berlekamp-Messey algorithm module configured to correct the one or more code errors.

15. A controller, comprising:
a read channel, including:
a reliability checker configured to receive bits of data read from a data storage and operable to associate a reliability factor with each bit of data;
a pre-calculator configured to associate bits having similar reliability factors into groups; and
an updater configured to iteratively correct errors based upon the reliability factor of a group.

16. The controller of claim 15 further comprising an integrated circuit disposed on a single die.

17. The controller of claim 15 further comprising at least two integrated circuits disposed on a separate integrated circuit dies and communicatively coupled to each other.

18. A hard-disk drive system, comprising:
a storage medium;
a read head configured to read data from the storage medium; and
a read channel coupled to the read head having an error-code correction module including:
a reliability checker configured to receive bits of data read from a data storage and operable to associate a reliability factor with each bit of data;
a pre-calculator configured to associate bits having similar reliability factors into groups; and
an updater configured to iteratively correct errors based upon the reliability factor of a group.

19. The hard-disk drive system of claim 18, further comprising a controller coupled to the storage medium, the read head and the read channel, the controller operable to control the operations of the hard-disk drive system.

20. A computer system, comprising:
a processor;
a storage medium coupled to the processor;
a controller for controlling a read head that is operable to read data from the storage medium; and
a read channel coupled to the read head having an error-code correction module including:
a reliability checker configured to receive bits of data read from a data storage and operable to associate a reliability factor with each bit of data;
a pre-calculator configured to associate bits having similar reliability factors into groups; and
an updater configured to iteratively correct errors based upon the reliability factor of a group.

21. A method, comprising:
reading bits of data from a data storage;
determining a reliability factor for each bit of data;
grouping bits of data into groups having similar reliability factors; and
correcting errors in the data based upon the determined reliability factors.

22. The method of claim 21, further comprising grouping bits of data into flip-words based upon each bit's reliability factor wherein a flip-word comprises bits having the same reliability factor.

23. The method of claim 22, further comprising ordering the flip-words in an order corresponding to the magnitude of each flip-word's reliability factor.

24. The method of claim 23, further comprising:
changing each bit in a first flip-word;
determining a total number of errors remaining in the bits of data read from the data store; and
if the total number of errors is determined to be less than a correction capability of an associated Chien-Formey search engine, then attempting to resolve all remaining errors with the Chien-Formey search engine.

25. The method of claim 24, further comprising iteratively repeating the changing of each bit in each flip-word such that each possible combination of each flip-word combinations is checked for total numbers of errors.

26. The method of claim 24, further comprising iteratively repeating the changing of each bit in each flip-word such according to a grey-code method.

27. A method, comprising:
determining that a grouping of bits of data read from a data store includes errors;
determining the number of errors in the read data;
determining reliability of bits and grouping bits into words based upon the determined reliability; and
if the total number of errors exceeds a threshold, then iteratively changing bits in the least reliable bits of data until the total number of errors no longer exceeds the threshold.

28. The method of claim 27 wherein the threshold comprises 20 errors.

29. The method of claim 27 wherein the grouping of bits comprises a data sector.

* * * * *